June 7, 1932.  W. H. PAULSON  1,861,642
CHAIN
Filed March 11, 1930   2 Sheets-Sheet 1
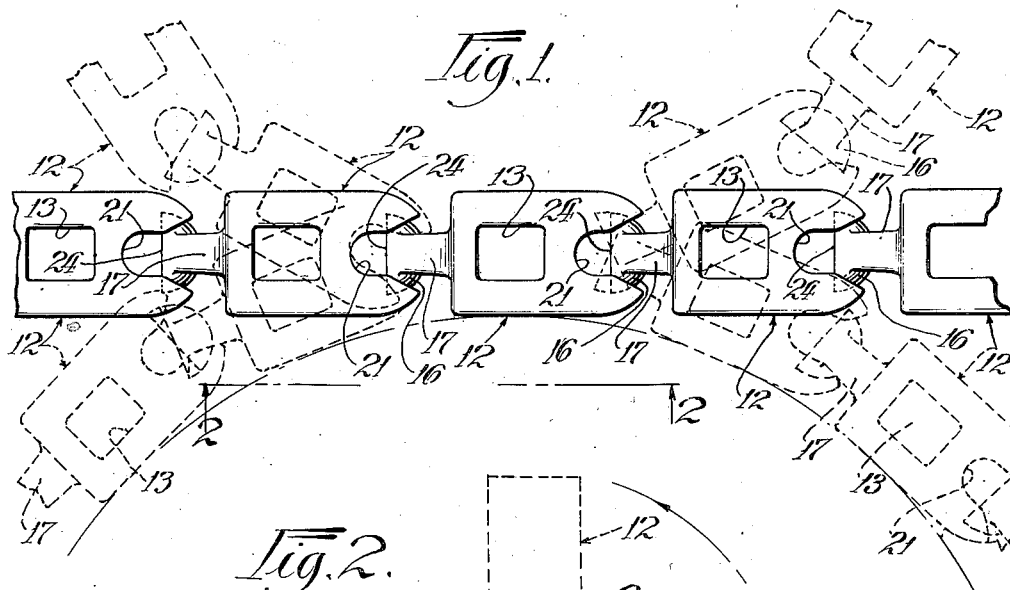
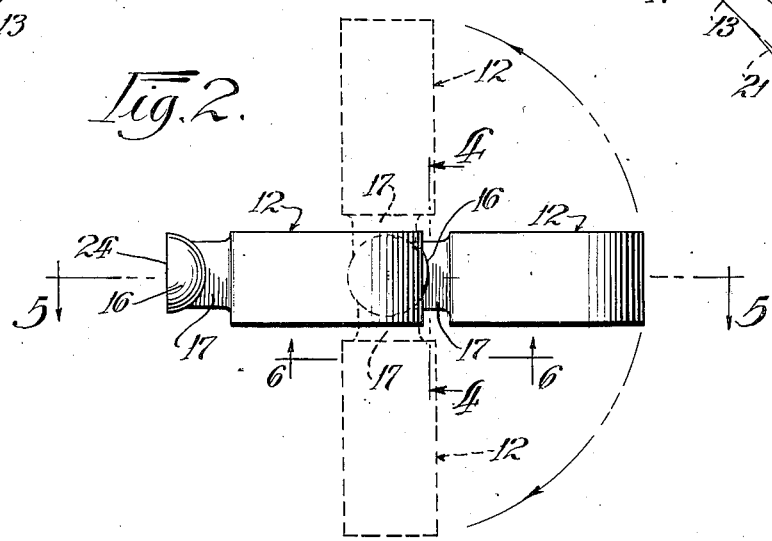
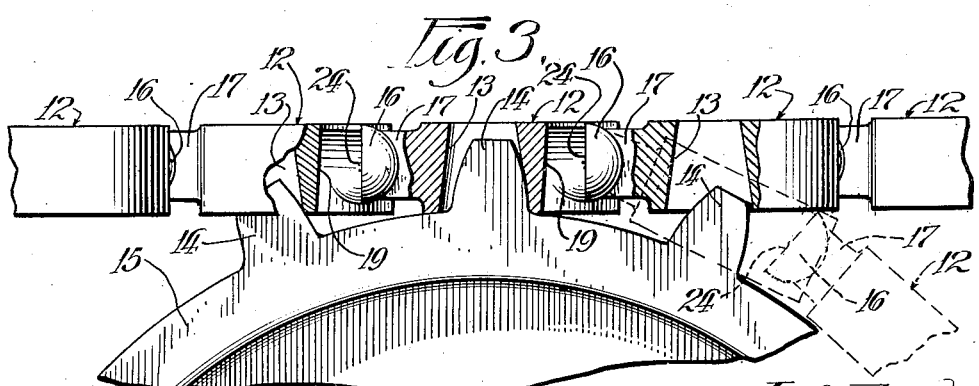

June 7, 1932. W. H. PAULSON 1,861,642
CHAIN
Filed March 11, 1930 2 Sheets-Sheet 2
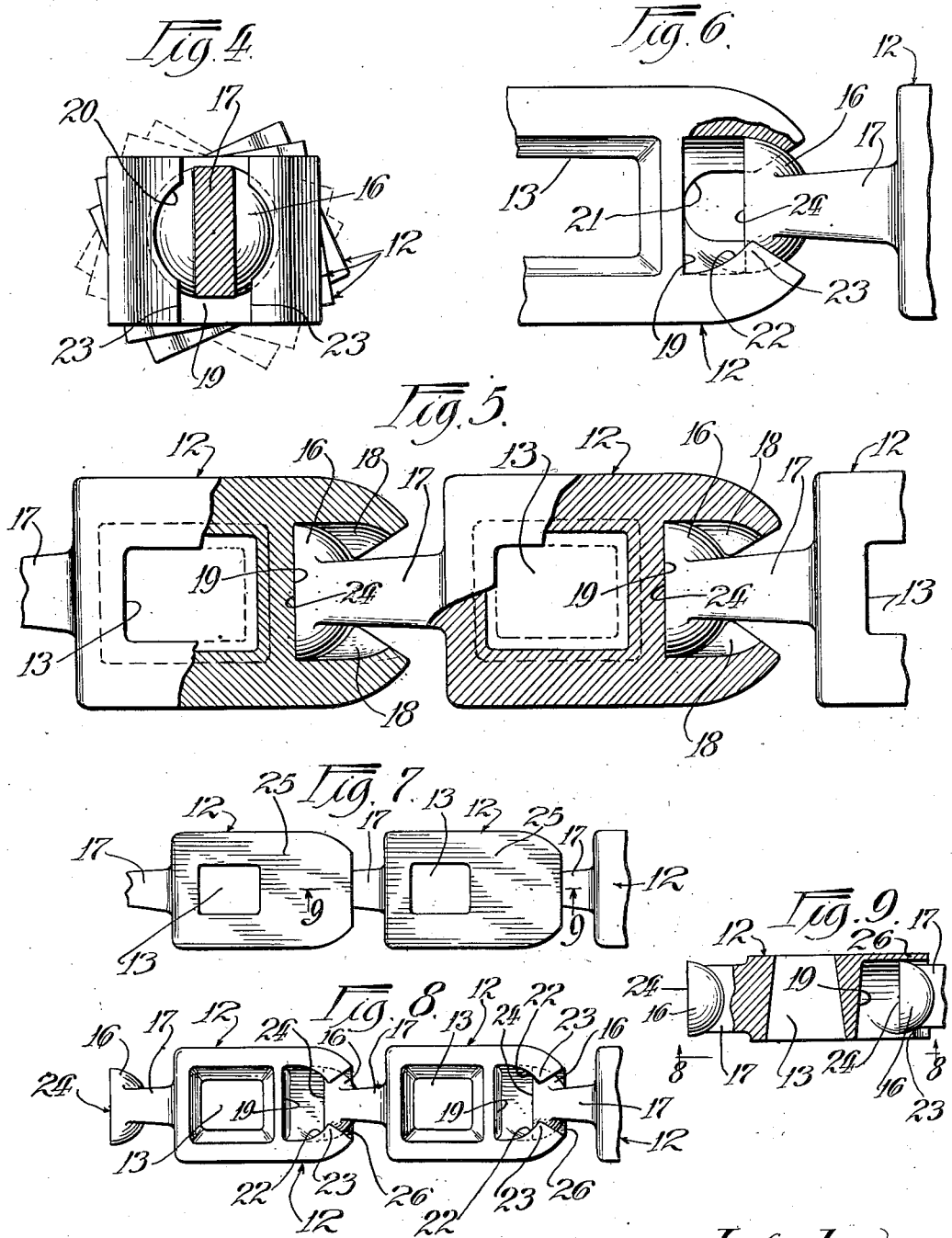

Patented June 7, 1932

1,861,642

UNITED STATES PATENT OFFICE

WALTER H. PAULSON, OF CHICAGO, ILLINOIS, ASSIGNOR TO HARRY D. LATHROP, OF CHICAGO, ILLINOIS

CHAIN

Application filed March 11, 1930. Serial No. 434,998.

This invention relates to improvements in a chain having as its object the provision of a strong, durable, and efficient construction, capable of flexing in a plurality of planes and directions without subjecting the construction to strains. A further object is the provision of an improved chain construction in which the respective links are joined by a special construction, allowing greater relative angular displacement of adjacent links without excessive strain or stress upon the parts. An additional object is the provision of an improved chain having provision for the convenient addition, replacement or deletion of links as occasion requires.

Other objects will appear hereinafter.

The invention consists in the combinations and arragements of parts hereinafter described and claimed.
The invention will be best understood by reference to the accompanying drawings forming a part of this specification and in which:

Fig. 1 is a plan view of a portion of the improved chain, showing a plurality of connected links and showing in dotted lines the degrees of angular flexing in either direction in a horizontal plane;

Fig. 2 is a side elevational view of two connected links of the chain, taken substantially on the line 2—2 of Fig. 1, and illustrating in dotted lines the degrees and extent of flexing in a vertical plane or plane perpendicular to the plane of flexing shown in Fig. 1;
Fig. 3 is a side elevational view, partly in section, of a portion of the chain in operative engagement with a sprocket wheel;

Fig. 4 is a cross sectional view of a plurality of links, taken on line 4—4 of Fig. 2, illustrating the possible torsional displacement of connected links;

Fig. 5 is an enlarged detail view, partly in section, substantially on the line 5—5 of Fig. 2, showing the manner of shifting adjacent links to effect their disengagement.

Fig. 6 is a detail view, taken substantially on the line 6—6 of Fig. 2, with a portion broken away, illustrating the preferred ball and socket engagement in operative position;

Fig. 7 is a plan view of a plurality of links of a slightly modified construction;

Fig. 8 is an inverted face view of the construction shown in Fig. 7; and

Fig. 9 is a sectional view, taken substantially on the line 9—9 of Fig. 8.

As illustrated in the drawings, the preferred embodiment of the invention comprises a plurality of links, each of which comprises a link block 12. As best shown in Fig. 3, each link block has flat top and bottom surfaces and is provided with a tooth engaging and receiving aperture 13 for the reception and engagement by a tooth 14 of a sprocket 15. Further, in the preferred construction, each link block is provided with an offset head 16 connected to the main block portion by a relatively narrow shank 17. As shown, the head 16 is preferably semispherical in general outline to complete a ball and socket engagement with a socket provided on an adjacent link. Therefore, at the end of the link 12 opposite that upon which the head 16 is provided, there is formed a socket 18 of concave formation and semi-spherical in outline to complete the ball and socket engagement with an adjacent head 16. The socket portion of each link is formed by a transverse wall having a substantially flat base 19 and is provided with an oppositely disposed opening 20 for the accommodation of an engaged shank 17. Preferably, opening 20 is of sufficient size to allow for lateral displacement of connected links to a considerable degree as shown in Fig. 1, and it will be understood that these dimensions may be increased or decreased to suit varying conditions. The upper surface of each link as shown in Fig. 1 has provided at the socket end an inwardly extending slot 21 of a width slightly greater than the width of the shank 17 to allow upward displacement in a vertical plane as shown in Fig. 2. The opposite face of each link has formed adjacent the socket end an opening 22 which, with the base 19 provides an opening of slightly greater area than the cross sectional area of a ball head 16, and this formation also serves to provide inwardly extending projections 23 which complete the socket for the operative ball and socket engagement. The purpose and function of the opening 22 is to make provision for disengagement of adjacent links by shifting the links toward each other until the transverse head end 24 contacts with base 19 when the head may be shifted laterally through opening 22 and two adjacent links disengaged. In general operation, the weight and tension upon the chain serve to maintain the links in operative engagement, but inasmuch as pivot pins and similar pivoting devices are dispensed with, a chain may be shortened or lengthened or links replaced, by the simple expedient of shifting adjacent links together in the manner described to effect disengagement.

In the modified form shown in Figs. 7, 8, and 9, the upper surface 25 of each link is made continuous over the socket portion to add strength to the structure. This consists in the extension of portion 26 and is a preferred adoption in installation where vertical flexing to the upper dotted position shown in Fig. 2 is not required.

The improved construction may be employed for a wide variety of purposes such as a conveyor chain, power drive chain, etc., and in cases where it is desired to have the chain flexed in a horizontal direction as shown in Fig. 1, suitable channels or grooves may be used for receiving the chain. The special construction further permits of great angular displacement as well as torsional displacement without exerting strain upon the parts, rendering the construction adaptable in a number of installations where a chain having pivotally connected links of the usual type will be objectionable. In this connection, a further advantageous feature resides in the fact that the wear is not confined to a small area or upon a relatively small part, but is distributed over the entire spherical surface of the engaging head and the entire concave surface of the cooperating socket.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A chain construction of the character described, comprising a plurality of links, each link having a main link block portion, a spherical head member, a shank portion joining said head member to said main link block portion, said main block portion provided with a tooth engaging and receiving aperture, said main block portion also provided with a concave semi-spherical socket portion for the engagement of the head member on an adjoining link to provide for flexing in a plurality of planes, a transverse wall formed in said main block portion and separating said tooth engaging and receiving aperture and said concave socket portion, and said socket portion provided with an inwardly spaced enlarged opening adjacent said transverse wall for the reception and disengagement of a head member on an adjoining link.

2. A chain construction of the character described, comprising a plurality of links, each link having a main link block portion, a spherical head member, a shank portion joining said head member to said main link block portion, said main block portion provided with a tooth engaging and receiving aperture, said main block portion also provided with a concave semi-spherical socket portion for the engagement of the head member on an adjoining link to provide for flexing in a plurality of planes, a transverse wall formed in said main block portion and separating said tooth engaging and receiving aperture and said concave socket portion, said socket portion provided with an inwardly spaced enlarged opening adjacent said transverse wall for the reception and disengagement of a head member on an adjoining link, and said socket portion provided with inwardly extending head engaging projections.

3. A chain construction of the character described, comprising a plurality of links, each link having a main link block portion, a spherical head member, a shank portion joining said head member to said main link block portion, said main block portion provided with a tooth engaging and receiving aperture, said main block portion also provided with a concave semi-spherical socket portion for the engagement of the head member on an adjoining link to provide for flexing in a plurality of planes, a transverse wall formed in said main block portion and separating said tooth engaging and receiving aperture and said concave socket portion, said socket portion provided with an inwardly spaced enlarged opening adjacent said transverse wall for the reception and disengagement of a head member on an adjoining link, said socket portion provided with inwardly extending head engaging projections, and said inwardly extending projections spaced apart a distance slightly greater than the width of a shank on an adjoining link whereby a pair of links may be disengaged by shifting said links in a direction opposed to normal tension and thence laterally.

4. A chain construction of the character described, comprising a plurality of links, each link having a main link block portion, a spherical head member, a shank portion joining said head member to said main link block portion, said main block portion provided with a tooth engaging and receiving aperture, said main block also provided with a concave semi-spherical socket portion for the engagement of the head member on an adjoining link to provide for flexing in a plurality of planes, a transverse wall formed in said main block portion and separating said tooth engaging and receiving aperture and said concave socket portion, said socket portion provided with an inwardly spaced enlarged opening adjacent said transverse wall for the reception and disengagement of a head member on an adjoining link, and said main block portion provided with substantially flat top and bottom surfaces.

5. A chain construction of the character described, comprising a plurality of links, each link having a main link block portion, a spherical head member, a shank portion joining said head member to said main link block portion, said main block portion provided with a tooth engaging and receiving aperture, said main block portion also provided with a concave semi-spherical socket portion for the engagement of the head member on an adjoining link to provide for flexing in a plurality of planes, a transverse wall formed in said main block portion and separating said tooth engaging and receiving aperture and said concave socket portion, said socket portion provided with an inwardly spaced enlarged opening adjacent said transverse wall for the reception and disengagement of a head member on an adjoining link, said socket portion provided with inwardly extending head engaging projections, and said main block portion provided with substantially flat top and bottom surfaces.

6. A chain construction of the character described, comprising a plurality of links, each link having a main link block portion, a spherical head member, a shank portion joining said head member to said main link block portion, said main block portion provided with a tooth engaging and receiving aperture, said main block portion also provided with a concave semi-spherical socket portion for the engagement of the head member on an adjoining link to provide for flexing in a plurality of planes, a transverse wall formed in said main block portion and separating said tooth engaging and receiving aperture and said concave socket portion, said socket portion provided with an inwardly spaced enlarged opening adjacent said transverse wall for the reception and disengagement of a head member on an adjoining link, said socket portion provided with inwardly extending head engaging projections, said inwardly extending projections spaced apart a distance slightly greater than the width of a shank on an adjoining link whereby a pair of links may be disengaged by shifting said links in a direction opposed to normal tension and thence laterally, and said main block portion provided with substantially flat top and bottom surfaces.

In testimony whereof I have signed my name to this specification.

WALTER H. PAULSON.